US007960690B2

(12) United States Patent
Schwartz et al.

(10) Patent No.: US 7,960,690 B2
(45) Date of Patent: Jun. 14, 2011

(54) AUTOMATIC GAIN CONTROL (AGC) METHOD FOR AN ION TRAP AND A TEMPORALLY NON-UNIFORM ION BEAM

(75) Inventors: Jae C. Schwartz, Gilroy, CA (US); Viatcheslav V. Kovtoun, Santa Clara, CA (US)

(73) Assignee: Thermo Finnigan LLC, San Jose, CA (US)

( * ) Notice: Subject to any disclaimer, the term of this patent is extended or adjusted under 35 U.S.C. 154(b) by 469 days.

(21) Appl. No.: 12/179,548

(22) Filed: Jul. 24, 2008

(65) Prior Publication Data

US 2010/0019144 A1 Jan. 28, 2010

(51) Int. Cl.
*B01D 59/44* (2006.01)
*H01J 49/00* (2006.01)
*H01J 49/40* (2006.01)

(52) U.S. Cl. ........ 250/282; 250/281; 250/283; 250/288; 250/286

(58) Field of Classification Search .................. 250/282, 250/283, 286, 288, 252.1, 281; 702/20–30
See application file for complete search history.

(56) References Cited

U.S. PATENT DOCUMENTS 5,479,012 A * 12/1995 Wells ............................ 250/282
5,572,022 A 11/1996 Schwartz et al.
7,323,682 B2 1/2008 McCauley et al.
2006/0006326 A1* 1/2006 Belov et al. .................. 250/282
2006/0016976 A1* 1/2006 Land et al. .................... 250/282
2008/0272288 A1* 11/2008 Guckenberger et al. ...... 250/283
2010/0042334 A1* 2/2010 Rardin et al. .................. 702/27

FOREIGN PATENT DOCUMENTS

EP 0 905 743 A1 3/1999
WO WO 2006/014285 A2 2/2006

OTHER PUBLICATIONS

Page et al. "Automatic Gain Control in Mass Spectrometry Using a Jet Disrupter Electrode in an Electrodynamic Ion Funnel" Journal of the American Society for Mass Spectrometry, 2005, 16, pp. 244-253.*

* cited by examiner

*Primary Examiner* — Robert Kim
*Assistant Examiner* — Brooke Purinton
(74) *Attorney, Agent, or Firm* — Michael C. Staggs

(57) ABSTRACT

An automatic gain control (AGC) technique and apparatus is introduced herein for any temporally non-uniform ion beam, such as, for example, an ion beam produced by a MALDI ion source so as to minimize space charge effects. The disclosed configurations and techniques can be achieved by using an ion optical gating element and applying a desired signal waveform (e.g., a square wave) having a predetermined duty cycle. The applied voltage amplitude of such a signal can be configured to switch between a voltage which fully transmits the ions, and a voltage which does not transmit any ions. The frequency is chosen to result in a period which is significantly lower than the smallest non-uniformity period. Techniques of the present invention can also be extended to methods of AGC which can use a single ion injection event from the ion source to avoid variations in ion numbers from an unstable ion source.

30 Claims, 7 Drawing Sheets

AUTOMATIC GAIN CONTROL (AGC) METHOD FOR AN ION TRAP AND A TEMPORALLY NON-UNIFORM ION BEAM

BACKGROUND OF THE INVENTION

1. Field of the Invention

The present invention relates to the field of mass spectrometry, and more particularly to the field of automatic gain control in mass spectrometry to avoid saturation and/or space charge effects.

2. Discussion of the Related Art

Automatic gain control (AGC) is a method of controlling the number of ions in an ion trap to avoid saturation and/or space charge effects. Conventionally, AGC includes first injecting ions into the ion trap for some predetermined time using some gating optical element, typically in a pre-scan. A measurement of the resultant signal in the pre-scan is taken, and a calculation is then performed to determine what injection time (i.e. how long the gate is open) is needed to yield a specified "target" amount of signal, the target being the optimum signal which avoids saturation or space charge effects in the trap. The calculation often uses a simple linear relationship between ion signal and injection time. This technique, therefore, assumes that the ion beam is uniform both in composition and intensity with respect to time, within the timescale of all injection times. That is, that the delivery of all ions from the ion source is linearly dependent on the injection time. However, such current AGC schemes are not applicable to temporally non-uniform sources since the beam cannot be linearly sampled using a variable injection time.

Background information for a mass spectrometer apparatus that utilizes an automatic ion supply control feature, is described and claimed in U.S. Pat. No. 5,572,022, entitled "Method And Apparatus Of Increasing Dynamic Range And Sensitivity Of A Mass Spectrometer," issued Nov. 5, 1996, to Schwartz et al., including the following, "An increased number of sample ions are introduced into the mass spectrometer for mass analysis with the aid of an automatic ion supply control, or feedback feature. The feedback portion of the invention controls the gating time, and hence the number of sample ions gated into the mass spectrometer, based on previous measurements of the ion content in the mass spectrometer to gate an amount relative to where space charge and saturation begins."

Additional background information for a spectrometer AGC method and system configured for a temporally continuous beam instrument, is described and claimed in U.S. Pat. No. 7,323,682 B2, entitled "Pulsed Ion Source For Quadrupole Mass Spectrometer And Method," issued Jan. 29, 2008, to McCauley et al., including the following, "In general, a variable duty cycle ion source assembly is coupled to a continuous beam mass spectrometer. The duty cycle can be adjusted based on a previous mass resolved scan data or real time sampling of ion intensities during mass analysis. This provides the ability to control the total number of ions formed and detected for any given mass during mass analysis. . . . In particular, this method allows ion abundance control on a mass-to-mass basis using a continuous beam device."

SUMMARY OF THE INVENTION

The present invention provides for techniques and configurations of protecting a mass spectrometer against sample over-loading, without sacrificing detection limits, with respect to detection of desired atoms or molecules embedded in a temporally non-uniform ion beam as produced from predetermined non-continuous ion source assemblies. In particular, a variable duty cycle is applied to one or more pulses of ions resultant from such an ion source, wherein the duty cycle is adjusted, often linearly adjusted based on a previous mass resolved scan, non-mass resolved or mass resolved pre-scan at duty cycle of greater than 0 up to about 100%. Such configurations and techniques, as disclosed herein, enable control of the total number of ions formed during the analysis itself.

As discussed herein, the frequency applied to the gating means can range from about 1 kHz up to about 1 GHz, and it is so chosen to result in a period which is substantially lower than the smallest non-uniformity period of any given packet of generated ions with the upper limit of frequency defined by the time required for the ion with lowest velocity, normally the heaviest mass ion, within such a generated packet to pass through the gating means. To illustrate, if the smallest period for a given pulse of ions is at about 100 ms, then a period that is substantially lower than such a pulse of ions is chosen to be at least ten times smaller, i.e., at about 10 milliseconds, to result in a given applied frequency to the gating means of the present invention. Thus, it is the duty cycle range that directly determines the dynamic range of the system and is limited by the desired dynamic range and limits of the electronics.

Accordingly, in one aspect, the present invention is directed to a mass spectrometer that is configured to operate with a non-continuous ion source that generates one or more temporally non-uniform packets of ions and a means for gating such temporally non-uniform packets of ions at a frequency that results in a period that is substantially lower than the smallest non-uniformity period of the generated one or more temporally non-uniform packet of ions. Thereafter, a mass analyzer is configured to receive the temporally non-uniform packets of ions, wherein one or more received ions within the packets of ions are then released from the mass analyzer to be measured as well as to provide feedback control of the duty cycle so that saturation and space charge effects can be minimized in the instrument.

In another aspect, the present invention provides for a method of operating a non-continuous mass spectrometer configured so to provide for ion abundance control receive that includes: generating one or more temporally non-uniform packets of ions, gating the one or more temporally non-uniform packets of ions at a duty cycle determined by a received signal and having a frequency that results in a period that is substantially lower than the smallest non-uniformity period of the generated one or more temporally non-uniform packet of ions, providing feedback control of the duty cycle so that saturation and space charge effects can be minimized in the non-continuous mass spectrometer; and measuring the gated one or more temporally non-uniform packets of ions to provide for mass analysis.

In a final aspect, the present invention provides for a method of operating a non-continuous mass spectrometer so as to provide for ion abundance control that includes: generating one or more temporally non-uniform packets of ions; first gating to an ion trap the one or more temporally non-uniform packets of ions at a first duty cycle; alternatively directing one or more non-gated temporally non-uniform packets of ions to a predetermined ion storage device during the off period of the first duty cycle; scanning the one or more temporally non-uniform packets of ions within the ion trap to provide for an ion abundance control; second gating stored ions from the predetermined ion storage device at a controlled second duty cycle determined by the ion abundance control, wherein the controlled duty cycle comprises a signal and having a frequency configured to result in a period that is substantially lower than the smallest non-uniformity period of the generated one or more temporally non-uniform packet of ions; mass analyzing the second gated one or more temporally non-uniform packets of ions.

The present invention is thus directed to a novel method and a mass spectrometer assembly that is beneficially configured with non-continuous sources, such as, for example, a Matrix Assisted Laser Desorption Ionization (MALDI) ion source, a Laser Desorption Ionization (LDI) ion source, and a Surface-Enhanced Laser Desorption/Ionization (SELDI) ion source. Accordingly, such configurations and methods disclosed herein enable the control of the number of ions to be detected from a non-continuous ion source that produces temporally non-uniform ion beams. Such configurations increases the dynamic range of configured detectors, reduces contamination of the system as a whole, while minimizing deleterious space charge effects.

DETAILED DESCRIPTION

Figure 1:
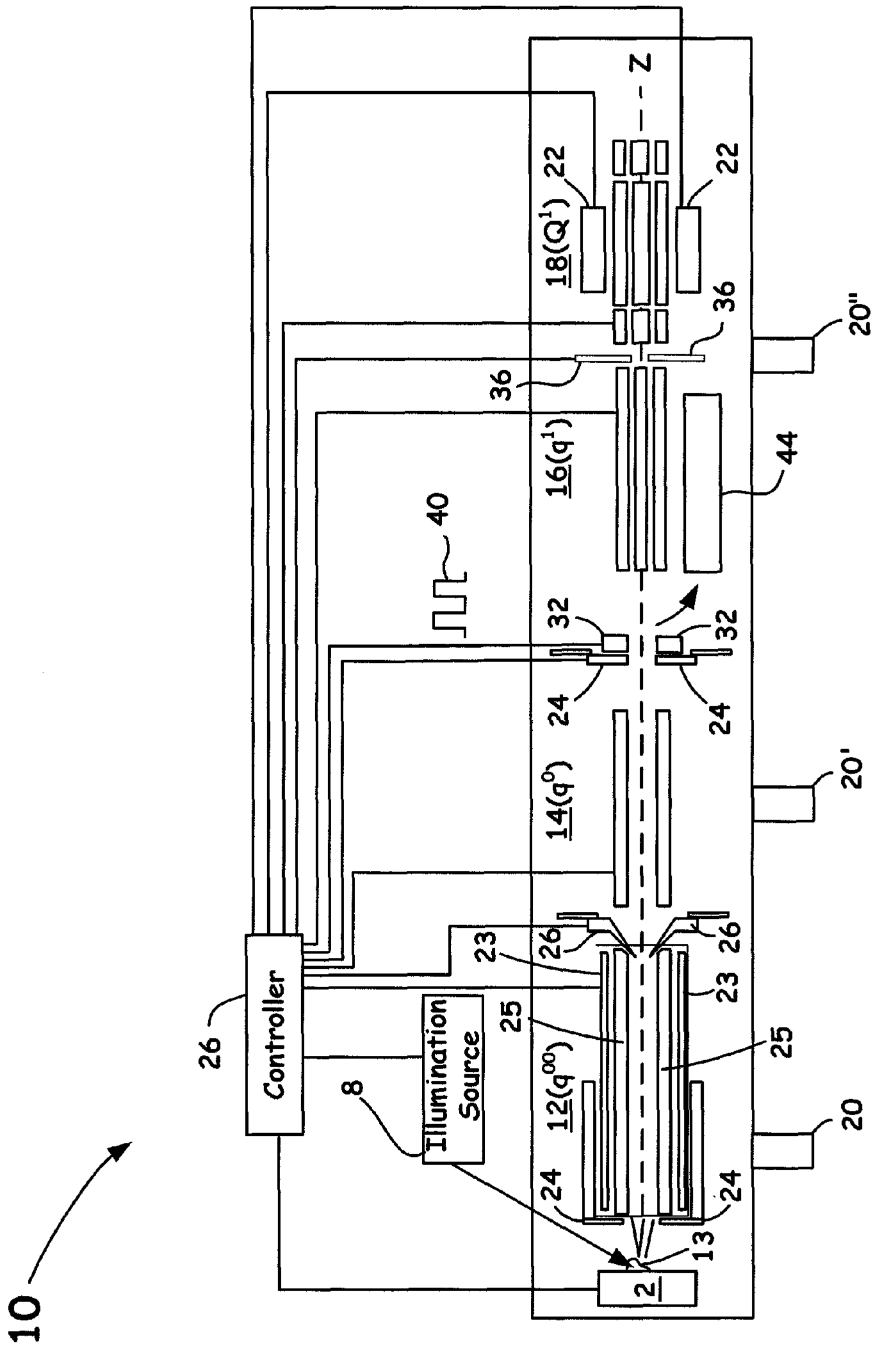
FIG. 1 shows a general mass spectrometer system of the present invention.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

Moreover, unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The present invention is directed to an AGC apparatus and method approach which can handle ion sources that produce temporally non-uniform pulses of ions, i.e., sources that provide relatively short pulses of ions with each pulse having some intensity distribution that travels with time and of which can actually begin to separate according to their m/z as in a time-of-flight mass spectrometer. Example sources for producing such temporally non-uniform beams, include, but are not limited to, a Surface-Enhanced Laser Desorption/Ionization (SELDI), a Laser Desorption Ionization (LDI) ion source, but most often by a Matrix Assisted Laser Desorption/Ionization (MALDI) source.

Therefore, by providing the approaches of the present invention, the resultant temporally non-uniform pulses of ions can be interrogated and/or regulated to provide the proper number of ions while still accurately representing the relative intensities of the differing ions to a down-stream mass spectrometer instrument, such as an ion trap, and thus protect such an instrument from sample over-loading. Example mass spectrometer instruments that can be integrated into the present invention can comprise any system that includes a trapping device, such as, but not limited to, systems having single stage devices, e.g., linear ion traps (LIT), an ion cyclotron resonance (ICR), an orbitrap (OT), a Fourier Transform Mass Spectrometer (FTMS), or dual stage devices, such as, a quadrupole/oa-TOF, a linear ion trap-time of flight (LIT-TOF), an LIT-orbitrap, a Quadrupole-ICR, IT-ICR, LIT-oa-TOF, or an LIT-orbitrap mass analyzer.

A beneficial aspect for regulating the number of ions produced by the ion sources, as disclosed herein, includes a linear adjustment of the duty cycle of an applied signal waveform to linearly effect the transmission through a gating means, such as, but not limited to, one or more ion optic lenses, as known and understood by those of ordinary skill in the art of mass spectrometry. The applied signal waveform itself can comprise any number of one or more shaped pulses, often however, by a shaped pulse comprising a square wave of sufficient frequency and amplitude capable of being configured with a variable duty cycle, wherein the signal waveform voltage amplitude can be configured to switch between a voltage which fully transmits the ions, and a voltage which does not transmit any ions, although this is not strictly required. Importantly, however, it is to be noted that it is the duty cycle of the present invention (i.e., the duration of the "on" time versus the duration of the "off" time over a specified time period), instead of the injection time, that is used to regulate the number of ions in the AGC process utilized herein. The control of the duty cycle, i.e., the selected duty cycle to prevent ion saturation, can be based on a previous mass resolved scan, or during a non-mass resolved or mass resolved pre-scan of discrete ion masses.

The gating means, as briefly mentioned above, can be any number of ion lenses that can quantitatively control the number of ions as known and as understood by those skilled in the art. Such elements can be configured with the ion source or can be configured as apart from the ion source and can be disposed, for example, at the output end of the ion source, at the entrance of the mass analyzer, or as any part of the ion optics for transferring ions. In addition, the ion lens operating as the gating means often can be a lens using an electric field, a grid using an electric field, but more often a deflection device using an electric field, such as, but not limited to, a split lens, instead of a reflection device, i.e., a device which repels the ions backwards, in order to avoid any accumulation of ions in the trapping devices up-stream.

The duty cycle of the gating means can be determined based on a prior scan, such as, for example, a scan associated with ion currents of specific detected masses of a previous scan. It is to be appreciated and to be understood that the frequency of the signal waveform, e.g., a square wave, that is applied to the gating means, is chosen to result in a period which is substantially lower than the smallest non-uniformity period of any given packet of generated ions with the upper limit of frequency defined by the time required for the ion with lowest velocity, normally the heaviest mass ion, within such a generated packet to pass through the gating element.

Therefore, as an illustration to provide guidance for how chosen frequencies of the applied signal waveform can be obtained, it is to be noted that if the entire ion pulse of the present invention is about 1 millisecond wide, a frequency higher than about 10 kHz is first chosen to achieve a useful precision. If the detected heavy ions comprise about 4000 m/z with about 1 eV of kinetic energy, this results in a time of about 25 usec, which sets an upper frequency at about 40 kHz. However, while such an example arrangement as discussed above is beneficial, it is to be appreciated and understood that the range of frequencies of the present invention can also comprise any frequency from about 1 kHz up to about 1 GHz so as to operate within the spirit and scope of the specifications of the present invention.

Specific Description

Turning now to the drawings, FIG. 1 shows a basic view of an exemplary mass spectrometer that comprises novel embodiments of the present invention. In particular, the mass spectrometer depicted in FIG. 1 and generally designated by the reference numeral 10, can include any number of ion optics in any number of arrangements, including rf-only transfer quadrupoles 12 ($q^{00}$), 14 ($q^{0}$), 16 ($q^{1}$), having a plurality of main electrodes (rods, flat) and in some instances auxiliary electrodes, any of which can be configured in a multipole structure, such as for example, octapoles, hexapoles, and quadrupoles. It is to be noted that such pole structures of the present invention can be operated either in the radio frequency (RF) mode only or the RF/DC mode. When only an RF voltage is applied between predetermined electrodes (e.g., rod pairs, flat electrode pairs) the apparatus is operated to transmit ions above some threshold mass. When a combination of RF and DC voltages are applied between rod pairs there is both an upper cutoff mass as well as a lower cutoff mass.

Moreover, the example embodiment of FIG. 1 is often configured with one or more ion lenses known by those of ordinary skill in the art that can comprise lens stacks (not shown), inter-pole lenses 24, conical skimmers 26, gating means 32 (e.g., split gate lenses), and/or field lenses 36, to cooperate with the above mentioned ion optics 12 ($q^{00}$), 14 ($q^{0}$), 16 ($q^{1}$) so as to direct and attenuate predetermined ions along the longitudinal direction (denoted by the letter Z and a dashed line) in order to be received by a mass analyzer 18 ($Q^{1}$), wherein the mass analyzer, as stated above, can include any system that includes a trapping device, such as, but not limited to, systems having single stage devices, e.g., linear ion traps (LIT), an ion cyclotron resonance (ICR), an orbitrap, a Fourier Transform Mass Spectrometer (FTMS), or dual stage mass analyzers, such as, a quadrupole/oa-TOF, a linear ion trap-time of flight (LIT-TOF), an LIT-orbitrap, a Quadrupole-ICR, IT-ICR, LIT-oa-TOF, or an LIT-orbitrap mass analyzer.

Such a mass spectrometer may also include an electronic controller 26, a power source (not shown) for supplying an RF voltage to the multipole devices disclosed herein, in addition to one or more voltage source (not shown) configured to supply DC voltages to predetermined devices, such as, for example, the trapping device/analyzer 22 and other multipole structures (e.g., auxiliary electrodes 23, ion traps and/or ion guides 12, 14 ($q^{00}$, $q^{0}$)) of the present invention. The electronic controller 26 is operably coupled to the various devices (e.g., pumps (not shown), sample plate 2, illumination source 8, sensors (not shown), lenses (e.g., 24, 32 (i.e., gating means), 36), ion guides 14, 16, and detectors 22) to control such devices and conditions at the various locations throughout the mass spectrometer 10, as well as to receive and send signals representing the particles being analyzed. Any number of vacuum stages (e.g., 20, 20', 20") may be implemented to enclose and maintain any of such devices along the ion path at a lower than atmospheric pressure.

In an example method of operation, a sample plate 2 (e.g., a MALDI sample plate) is configured within system 10 of FIG. 1 and a portion is illuminated via a particle beam source 8 at an appropriate energy for the material 13 configured on the sample plate 2. As an example arrangement, the frequency of the particle beam source 8 so chosen may be in the radiofrequency, infrared, visible or in the ultraviolet range. The particle beam source 8 can be an ionizing electron beam but often a pulsed UV laser (e.g., a nitrogen laser at 337 nm or a tripled Nd:YAG laser at 355 nm wave length) to provide the required energy density above the threshold for ion production. Upon illumination, desorbed ions are then capable of being directed into, for example, the multipole structure 12 ($q^{00}$) operated as, for example, an ion guide but in some arrangements, as an ion trap capable of receiving a number of ionized atoms or molecules of a sample.

When operated as an RF ion trap, the pressure in the container having the multipole structure 12 ($q^{00}$) is manipulated to be about 75+/−10 mTorr via a mechanical pump (not shown) and gas introduced by means known in the art. With respect to the multipole structure 12 ($q^{00}$) itself, such an element can also be configured with one or more auxiliary electrodes 23 (flat or finger electrodes) configured between main electrodes 25 to provide a gradient DC field of up to about 100 V so as to efficiently urge predetermined ions to the exit face of multipole structure 12 ($q^{00}$). When desired, predetermined trapped ions can then be pulsed via controller 26, as known to those skilled in the art, so to be output along the axial direction Z in order to provide one or more desired temporally non-uniform ion beams. Such temporally non-uniform ion beams are then capable of being drawn through a conical skimmer 26 configured with a central orifice or aperture to separate the pressurized region of ($q^{00}$) from the even lower pressurized region of down to about 1 mTorr that comprises ($q^{0}$). The temporally non-uniform ion beam that travels through the conical skimmer 26 can then be further directed to the very low pressurized ion trap 18 ($Q^{1}$) region (e.g., a pressurized region of down to about $10^{-5}$ Torr) via, for example, lenses 24, 32 (i.e., gating means), 36, and ion guides 14 ($q^{0}$) and 16 ($q^{1}$), as described hereinafter.

In particular, the temporally non-uniform ion pulse(s) that travels through the conical skimmer 26 is manipulated by quadrupole ion guide 14 ($q^{0}$) so chosen to maintain a streamlined beam based on its hyperbolic electrode profile. As one example arrangement, quadrupole ion guide 14 ($q^{0}$) can comprise a square quadrupole structure that is coaxially aligned with an octapole ion guide 16 ($q^{1}$) so chosen for its flat electrode profile, wherein both guides are operated by application of appropriate RF and/or DC voltages to the pole structures as is well known in the art so as to guide pulses of ions of interest. Accordingly, pulses of temporally non-uniform ion beams can be urged under the influence of DC voltages applied between the conical skimmer 26, lens 24 configured with a conductance limiting aperture to separate pressured regions ($q^1$) from ($Q^1$), and by offset DC voltages applied to the ion guides 14 ($q^0$) and 16 ($q^1$).

In the novel arrangement of the present invention, as discussed above, the gating means 32, as shown in FIG. 1, such as, but not limited to, one or more ion optic lenses, but often a split lens, is utilized to receive one or more shaped pulses of a predetermined frequency from about 1 kHz up to about 1 GHz (i.e., duty cycle) as directed by the controller 26, as shown in FIG. 1. In addition the gating means 32 receives such shaped pulses with an amplitude designed to switch between a voltage which fully transmits the ion pulses, and a voltage which does not transmit any ion pulses. It is to be appreciated, however, as noted previously, that it is the duty cycle of the present invention, instead of the injection time, that is used to regulate the number of ions in the AGC process utilized herein.

As previously stated, the duty cycle applied to the gating means 32 to enable ion abundance control scan be determined based on a prior scan. In particular, the controller 26 can determine a threshold ion current based on a scan of one or more temporally non-uniform ion pulses detected in a previous scan as registered by detector(s) 22. If such a registered current exceeds the determined threshold, the duty cycle directed by the controller 26 to the gating means 32 can be reduced automatically during the actual scan itself or before the desired scan. In an alternative arrangement, the controller 26 can be configured to direct a low duty cycle for each scan of ion pulses, thus providing for high cleanliness so as to prevent from the outset space charge and saturation effects yet recognizing that sensitivity may be compromised.

Figure 2:
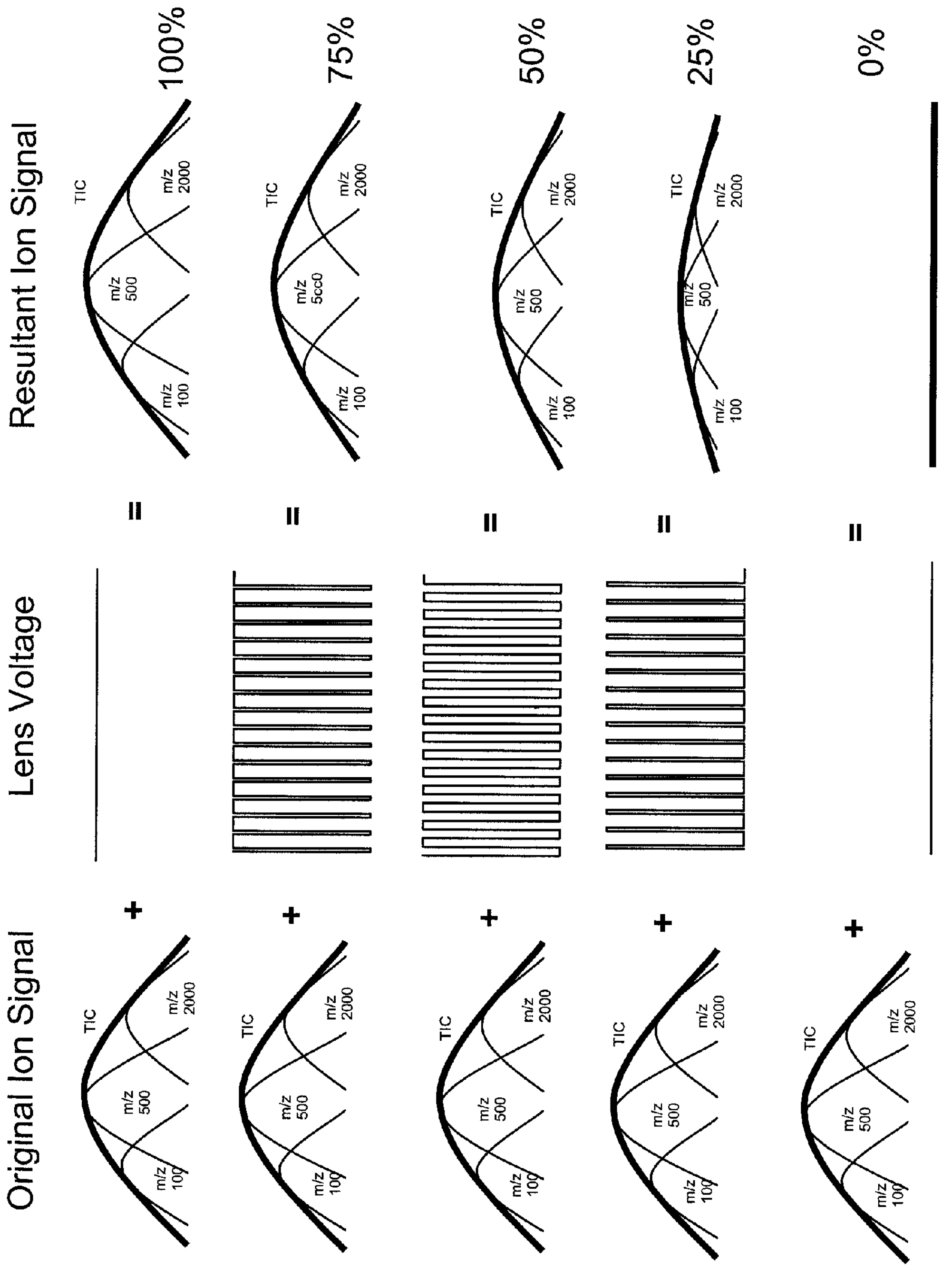
FIG. 2 depicts the pulsing scheme of the present invention at different duty cycles of 100%, 75%, 50%, 25% and 0% and demonstrates its effect on a generic example of a non-uniform ion pulse produced from a non-continuous ion source.
Figure 3A:
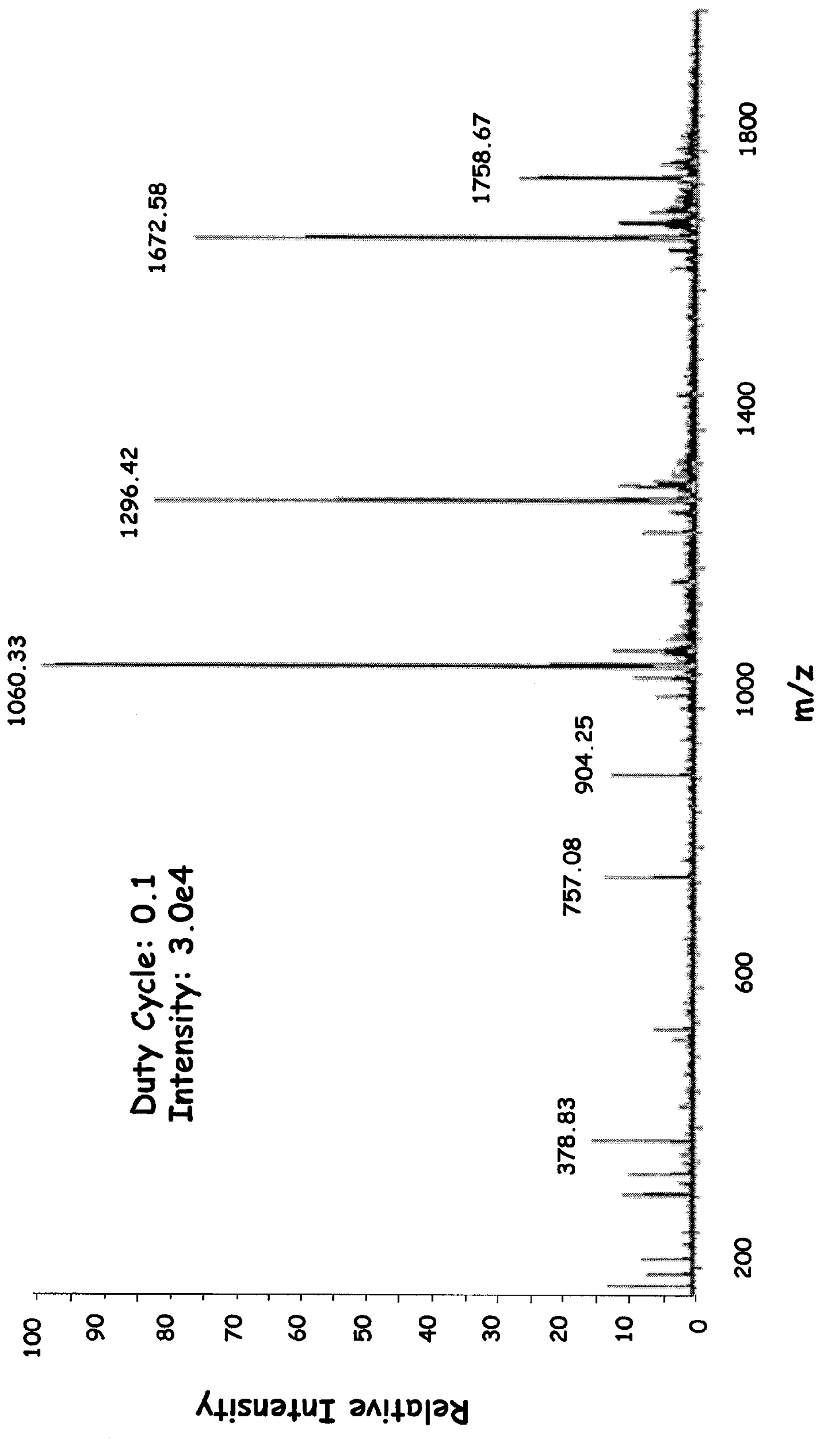
FIG. 3A shows experimental data using a mixture of peptides gated at a duty cycle of 10%
Figure 3B:
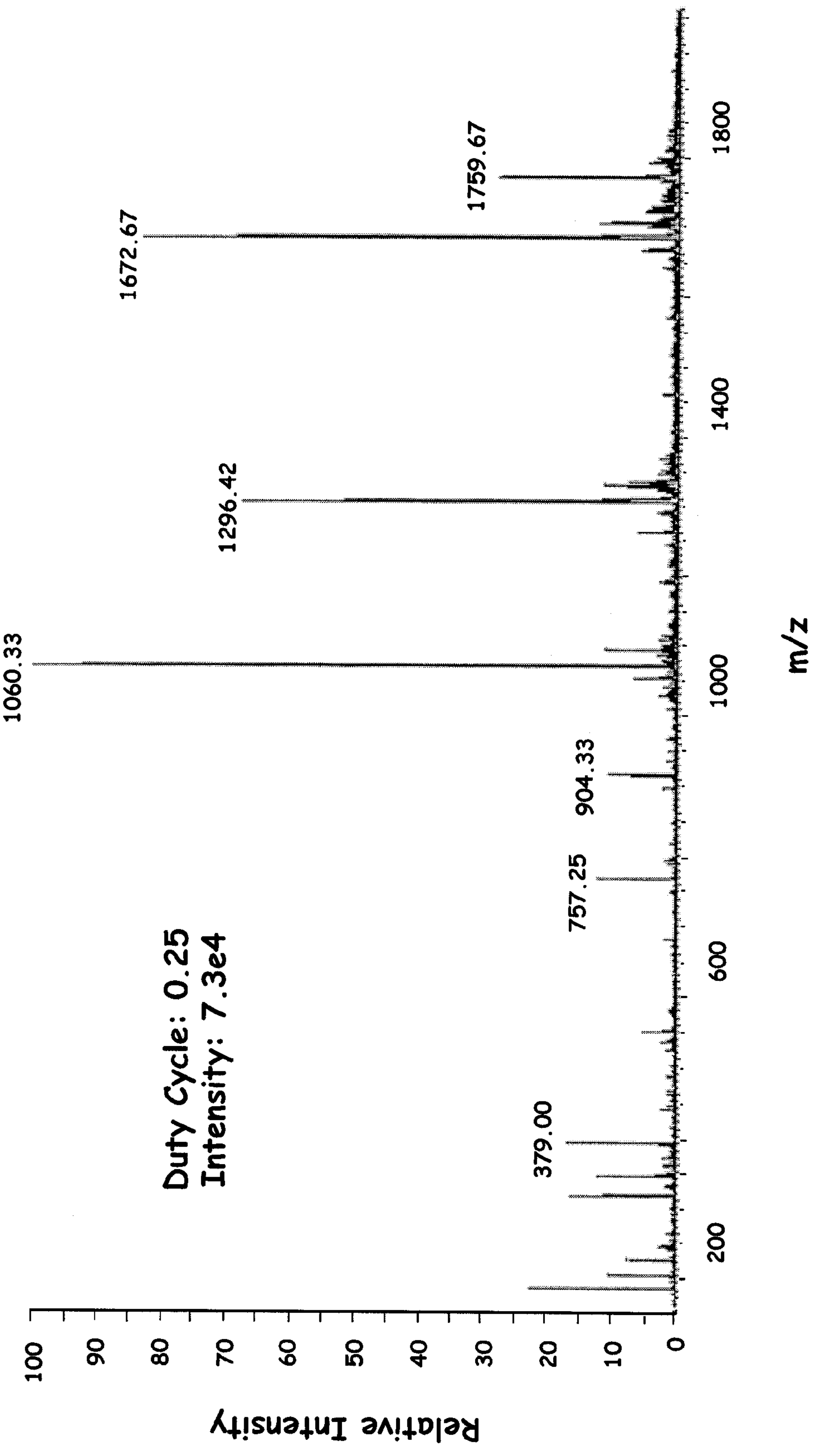
FIG. 3B shows experimental data using a mixture of peptides gated at a duty cycle of 25%.
Figure 3C:
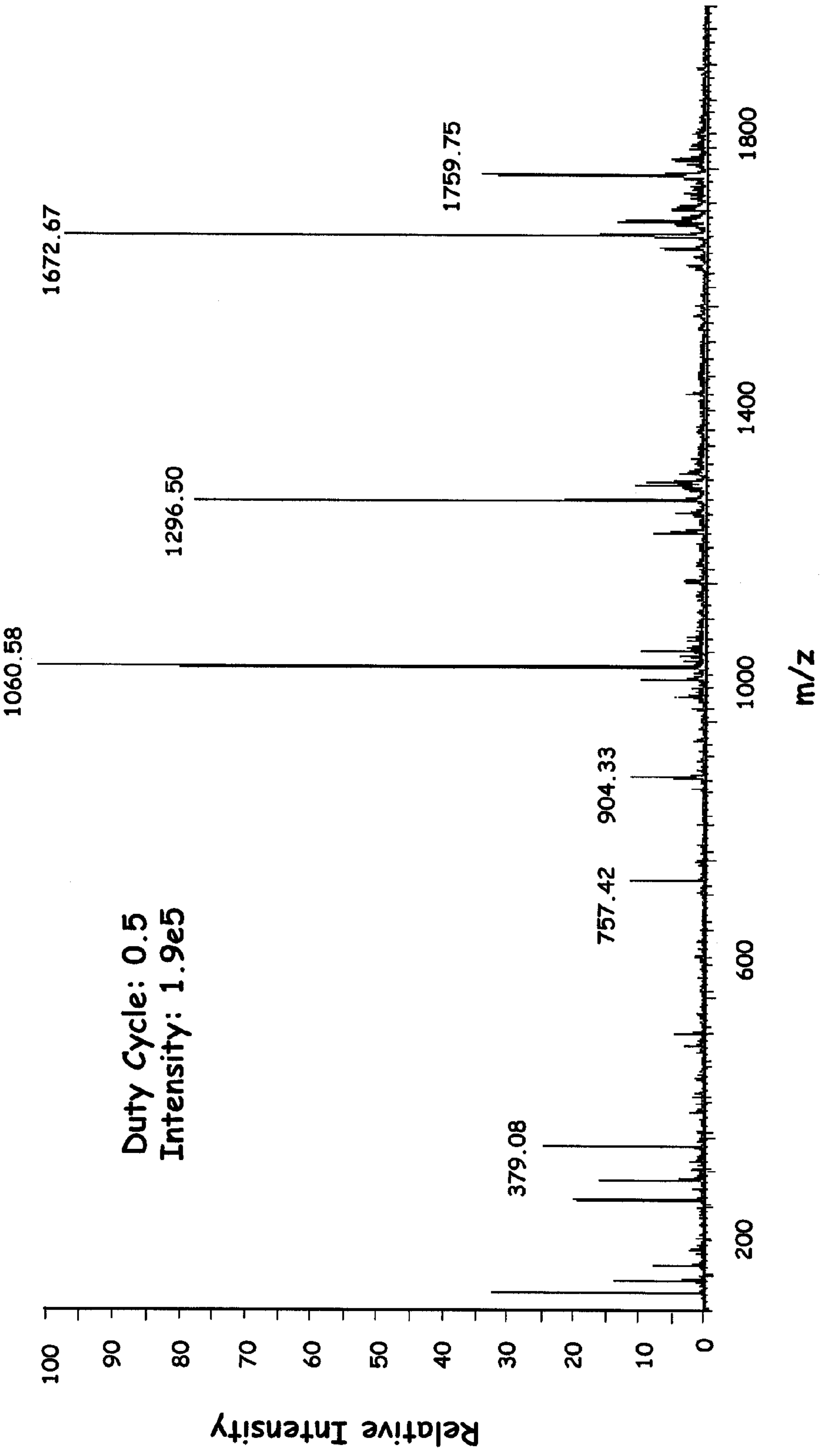
FIG. 3C shows experimental data using a mixture of peptides gated at a duty cycle of 50%.
Figure 3D:
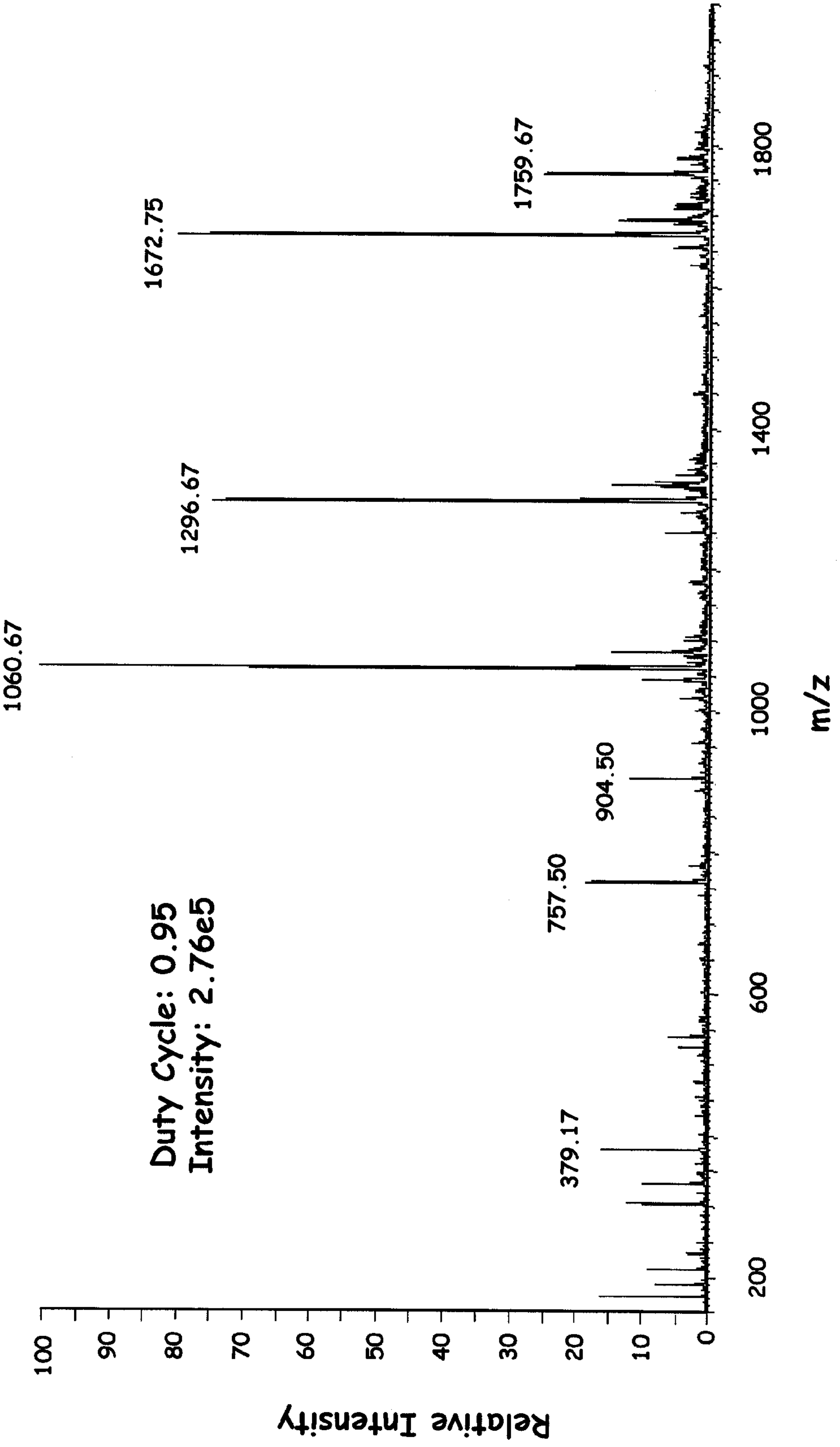
FIG. 3D shows experimental data using a mixture of peptides gated at a duty cycle of 95%.

FIG. 2 depicts the pulsing schemes of the present invention as discussed above wherein the initial non-uniform ion pulse is acted on by the modulated lens, i.e., gating means 32, at different duty cycles including 100%, 75%, 50%, 25% and 0%. The resultant ion pulse has not changed in composition or time, but simply has been attenuated proportionally to the duty cycle and therefore maintaining the relative intensities of the different ions produced by the source. Accordingly, an additional step in the present invention also can include a scaling factor that is inversely proportional to an applied duty cycle so as to scale measured intensities and thus provide quantitative values from the mass spectrometer.

The gating means 32, as briefly mentioned above, can be any number of lensing means known in the art, such as, but not limited to, a lens using an electric field, a grid using an electric field, but more often a deflection device using an electric field, such as, but not limited to, a split lens. It is to be noted that the ions pulsed into the Analyzer, i.e., the trap 18 ($Q^1$) as allowed by gating means 32, are spread out in time. Within such a pulse(s), there may be m/z separation which can result in pulse-widths of a single m/z. By using a square wave at a designed frequency range from about 1 kHz up to about 1 GHz (e.g., the square wave 40 as denoted in FIG. 1) applied to the gate lens 32 of the present invention, a desired precision can be obtained for AGC regulation.

FIGS. 3A-3D show experimental data using a mixture of peptides on a commercially available LTQ mass spectrometer using a MALDI ionization source. A normal split-gate lens implemented as the gating means 32 to produce such data had been modulated between a deflection voltage of 0 V for transmission, and 25 V for diverting the ion beam. A frequency of modulation of 1 KHz applied for 20 ms resulted in the data shown using duty cycles of 10% FIG. 3A, 25% FIG. 3B, 50% FIG. 3C, and 95% FIG. 3D. As can be seen from each data plot of FIG. 3, the composition of the spectra is not affected, but the relative intensities track the duty cycle linearly indicating that duty cycle may be utilized to linearly control the number of ions delivered to the mass analyzer.

Figure 4:
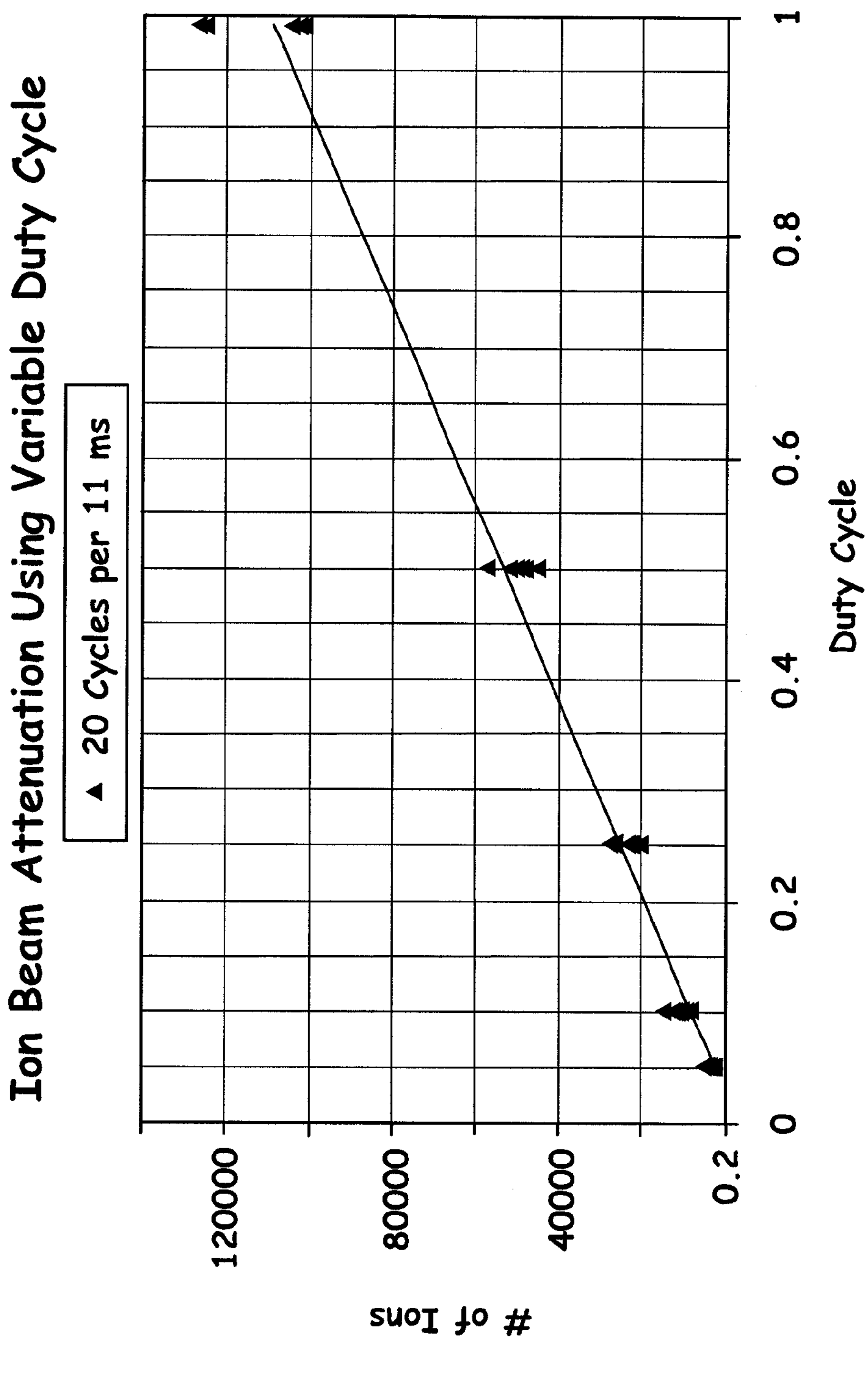
FIG. 4 shows a linear trend plot of the total signal (number of ions) versus duty cycle using an embodiment of the present invention.

FIG. 4 shows a plot of the total signal (number of ions) versus duty cycle, explicitly showing the linear trend. Some variation from linearity and also at each duty cycle value is observed and is attributed to the variability of producing ions in the MALDI source from experiment to experiment.

As a further improvement and another exemplary arrangement of the present invention, pulsed ions can be directed into a temporary storage device during the "off" period of the modulated voltage to store the ions instead of losing them. This enables the actual duty cycle of the use of ions to be significantly higher than by allowing those ions to be destroyed. In such an approach, the ions produced for a scan are now alternatively directed by the gating means 32 to an additional ion storage device 44 (also denoted with a directional arrow) and the analyzing ion trap 18 ($Q^1$), as shown in FIG. 1, in a pre-set proportion, such as, for example, up to about 10:1, using the appropriate duty cycle of a switching lens system, i.e., gating means 32. A scan of the contents of the trap can then be performed. The AGC calculation is completed and the target number of ions can then be achieved by transferring stored ions from the storage device (instead of from the source) through, in another arrangement, a second modulated lens so as to avoid the need for additional ions from the ion source. This method is especially good for sources such as MALDI, which have significant shot-to-shot variation that can degrade the performance of AGC if two different pulses of ions from a source are used. This method allows a single pulse (or a single set of pulses) to be used for the AGC process instead of utilizing a previous scan and therefore allows significantly more precision in controlling the number of ions in an analytical scan. Alternatively, a segmented trap which has a specified ratio of segment lengths can be used. For example, ions can be injected into the segmented trap, e.g., ion trap 18 ($Q^1$), and partitioned up into the segment which is 10% of the entire trap and a segment which is 90%. Ions are analyzed from, for example, the 10% section and an AGC calculation is done. The determined number of ions can then be transferred from the larger (90%) section using the appropriate modulated gating scheme.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention, as defined by the following claims.

The invention claimed is:

1. A non-continuous mass spectrometer to provide mass analysis, comprising:

an ion source configured to generate one or more temporally non-uniform packets of ions;

means for gating said one or more temporally non-uniform packets of ions at a controlled duty cycle as determined by a received signal and having a frequency configured to result in a period that is substantially lower than the smallest non-uniformity period of said generated one or more temporally non-uniform packet of ions; and a mass analyzer configured to receive said gated one or more temporally non-uniform packets of ions, wherein a prior gated one or more received ions within said packets of ions are released for ion abundance control to provide for said controlled duty cycle.

2. The mass spectrometer of claim 1, wherein an upper limit of said frequency is defined by the time required for the ion with lowest velocity within respective said generated one or more temporally non-uniform packet of ions to pass through said gating means.

3. The mass spectrometer of claim 1, wherein said means for gating provides for one or more predetermined fixed duty cycles.

4. The mass spectrometer of claim 1, wherein said duty cycle comprises a duty cycle greater than 0 up to about 100%.

5. The mass spectrometer of claim 4, wherein a measured intensity of said gated one or more temporally non-uniform packets of ions are scaled inversely proportional to said duty cycle.

6. The mass spectrometer of claim 1, wherein said duty cycle comprises a linear adjustment to linearly effect the transmission through a gating means.

7. The mass spectrometer of claim 1, wherein the duty cycle of the electron gate is adjusted based on a previous scan.

8. The mass spectrometer of claim 1, wherein a predetermined duty cycle is selected to prevent a detector from ion saturation.

9. The mass spectrometer of claim 1, wherein said gating means further comprises a split lens configured to direct ionized atoms and molecules to said mass analyzer.

10. The mass spectrometer of claim 1, wherein said ion source comprises at least one source selected from: a Matrix Assisted Laser Desorption Ionization (MALDI) ion source, a Laser Desorption Ionization (LDI) ion source, and a Surface-Enhanced Laser Desorption/Ionization (SELDI) ion source.

11. The mass spectrometer of claim 10, wherein said ion source further comprises an ion collection instrument configured to collect said one or more temporally non-uniform packets of ions from said at least one source, wherein said ion collection instrument is further configured to provide one or more temporally non-uniform packets of ions.

12. The mass spectrometer of claim 1, wherein said mass analyzer comprises at least one single stage device selected from a linear ion trap (LIT), an ion cyclotron resonance (ICR), an orbitrap, and a Fourier Transform Mass Spectrometer (FTMS).

13. The mass spectrometer of claim 1, wherein said mass analyzer comprises at least one dual stage device selected from: a quadrupole/ oa-TOF, LIT-TOF, LIT-orbitrap, Quadrupole-ICR, IT-ICR, LIT-oa-TOF, and a LIT-orbitrap mass analyzer.

14. The mass spectrometer of claim 1, wherein said frequency is selected between about 1 kHz up to about 1 GHz.

15. A method of operating a non-continuous mass spectrometer so as to provide to provide for ion abundance control, comprising:

generating one or more temporally non-uniform packets of ions;

gating said one or more temporally non-uniform packets of ions at a controlled duty cycle as determined by a received signal, said signal having a frequency configured to result in a period that is substantially lower than the smallest non-uniformity period of said generated one or more temporally non-uniform packet of ions; and mass analyzing said gated one or more temporally non-uniform packets of ions.

16. The method of claim 15, wherein said gating step further comprises defining an upper limit of said frequency by the time required for the ion with lowest velocity within respective said generated one or more temporally non-uniform packet of ions to pass through a gating means.

17. The method of claim 15, wherein said gating step further provides for one or more predetermined fixed duty cycles.

18. The method of claim 15, wherein said gating step provides for a duty cycle greater than 0 up to about 100%.

19. The method of claim 18, wherein a measured intensity of said gated one or more temporally non-uniform packets of ions are scaled inversely proportional to said duty cycle.

20. The method of claim 15, wherein said gating step provides for a duty cycle that comprises a linear adjustment to linearly effect the transmission through a gating means.

21. The method of claim 15, wherein said gating step provides for a duty cycle that is adjusted based on a previous scan.

22. The method of claim 15, wherein said gating step provides for a duty cycle that is selected to prevent a detector from ion saturation.

23. The method of claim 15, wherein said gating step provides for a split lens configured to direct ionized atoms and molecules to a mass analyzer.

24. The method of claim 15, wherein said generating step comprises at least one source selected from: a Matrix Assisted Laser Desorption Ionization (MALDI) ion source, a Laser Desorption Ionization (LDI) ion source, and a Surface-Enhanced Laser Desorption/Ionization (SELDI) ion source.

25. The method of claim 24, further comprising an ion collection instrument configured to collect said one or more temporally non-uniform packets of ions from said at least one source, wherein said ion collection instrument is further configured to provide for said one or more temporally non-uniform packets of ions upon at a predetermined time.

26. The method of claim 15, wherein said frequency is selected from a range of about 1 kHz up to about 1 GHz.

27. The method of claim 15, further comprising:

partitioning in a pre-set proportion, said generated one or more temporally non-uniform packets of ions into a segmented ion trap;

analyzing said trapped ions from a first segment of said segmented ion trap to determine said controlled duty cycle and enable ion abundance control; and gating using said controlled duty cycle, said trapped ions from a second segment of said segmented ion trap for mass analysis.

28. A method of operating a non-continuous mass spectrometer configured so as to provide for ion abundance control, comprising:

generating one or more temporally non-uniform packets of ions;

first gating to an ion trap said one or more temporally non-uniform packets of ions at a first duty cycle;

alternatively directing one or more non-gated temporally non-uniform packets of ions to a predetermined ion storage device during the off period of said first duty cycle;

scanning said one or more temporally non-uniform packets of ions within said ion trap to provide for an ion abundance control;

second gating stored ions from said predetermined ion storage device at a controlled second duty cycle determined by said ion abundance control, wherein said controlled duty cycle comprises a signal and having a frequency configured to result in a period that is substantially lower than the smallest non-uniformity period of said generated one or more temporally non-uniform packet of ions;

mass analyzing said second gated one or more temporally non-uniform packets of ions.

29. The method of claim 28, wherein the ions directed to said predetermined ion storage device during the off period of said first duty cycle in ratio to the ions directed to said ion trap during the on period of said duty cycle is in a pre-set proportion of up to about 10:1.

30. The method of claim 28, wherein a measured intensity of said mass analyzed second gated one or more temporally non-uniform packets of ions are scaled inversely proportional to said controlled duty cycle.

* * * * *